(12) United States Patent
Chung et al.

(10) Patent No.: US 7,859,132 B2
(45) Date of Patent: Dec. 28, 2010

(54) APPARATUS, SYSTEM, AND METHOD FOR SAFELY CONNECTING A DEVICE TO A POWER SOURCE

(75) Inventors: Chu R. Chung, Cary, NC (US); Cecil C. Dishman, Raleigh, NC (US); Jen-Ching Lin, Apex, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 12/174,536

(22) Filed: Jul. 16, 2008

(65) Prior Publication Data

US 2010/0013323 A1 Jan. 21, 2010

(51) Int. Cl.
*H01H 83/00* (2006.01)
(52) U.S. Cl. .................... 307/39; 307/113; 307/115; 307/125; 307/130
(58) Field of Classification Search .............. 307/39, 307/113, 115, 125, 130
See application file for complete search history.

(56) References Cited

U.S. PATENT DOCUMENTS

| | | |
|---|---|---|
| 4,951,009 A | 8/1990 | Collins |
| 5,477,089 A | 12/1995 | Porter |
| 5,736,906 A | 4/1998 | Jacobson |
| 5,973,416 A * | 10/1999 | Guenther .................... 307/125 |
| 6,133,749 A | 10/2000 | Hansen et al. |
| 6,812,715 B2 * | 11/2004 | Chiozzi et al. .............. 324/691 |
| 6,904,144 B1 | 6/2005 | Patel |
| 6,956,383 B2 | 10/2005 | Bartley et al. |
| 2008/0186032 A1 * | 8/2008 | Van Bezooijen et al. .... 324/646 |

\* cited by examiner

*Primary Examiner*—Hal I. Kaplan
(74) *Attorney, Agent, or Firm*—Kunzler Needham Massey & Thorpe

(57) ABSTRACT

An apparatus, system, and method are disclosed for safely connecting a device to a power source. The invention includes a power bus switch that operates to selectively allow operational power to flow from a power supply to a load. The operational power is independent of auxiliary power which may be separately provided to the load. A detection module determines whether an input impedance of the load is greater than a minimum impedance threshold in response to the load being connected to the power supply. A switch module causes the power bus switch to allow operational power to flow to the load in response to the detection module determining that the input impedance is greater than the minimum impedance threshold. Thus, if the load has an acceptable input impedance level, then operational power may be provided to the load without risk of failure to the power system.

20 Claims, 6 Drawing Sheets

APPARATUS, SYSTEM, AND METHOD FOR SAFELY CONNECTING A DEVICE TO A POWER SOURCE

BACKGROUND

1. Field of the Invention

This invention relates to power supplies and more particularly relates to safely connecting devices to a power source.

2. Description of the Related Art

A power supply, sometimes known as a power supply unit or PSU, is a device or system that supplies electrical or other types of energy to an output load or group of loads. A power supply, in some embodiments may be configured to convert power in one form to another form, such as converting AC power to DC power. The regulation of power supplies is typically done by incorporating circuitry to tightly control the output voltage and/or current of the power supply to a specific value. The specific value is closely maintained despite variations in the load presented to the power supply's output, or any reasonable voltage variation at the power supply's input.

A single power supply maybe used, in some cases, to simultaneously provide power to several electronic devices or loads. Additional loads may be connected to or disconnected from the power supply as needed. When a load is connected to a power supply, it is possible that the load may have a short or other failure that may cause system errors and system shut down due to the bus voltage dropping too low. In extreme cases, such failures can even cause catastrophic system failures due to fire or melting circuitry.

Conventional art relies on over-current or over-load protection designed into the power system to prevent a shorted or very low impedance load from causing a system failure. However, presently available over-load protection devices are unable to react quickly enough to prevent system bus voltage interruption, output-latching, or even physically damaged hardware. In cases, where there are multiple loads connected to a single power supply it may be difficult or impossible to detect a short one of the loads before damage has already been incurred, or a fault in a single load may cause an interruption of power to other loads. Further, the tripping of an over-load protection device can itself cause unwanted results in the performance of a power supply, such as sudden drops or increases in power on a power bus.

The present invention is provided overcome the problems in the conventional art.

BRIEF SUMMARY

From the foregoing discussion, it should be apparent that a need exists for an apparatus, system, and method that checks a load's input impedance prior to providing power to the load to avoid a power system failure due to an unexpectedly low impedance condition such as is caused by an electrical short. Beneficially, such an apparatus, system, and method would allow a load, including "hot pluggable" loads, to be safely connected to a power supply without risk of system failure.

The present invention has been developed in response to the present state of the art, and in particular, in response to the problems and needs in the art that have not yet been fully solved by currently available power systems. Accordingly, the present invention has been developed to provide an apparatus, system, and method for safely connecting a device to a power source that overcome many or all of the above-discussed shortcomings in the art.

The apparatus to safely connect a device to a power source includes a power bus switch that operates to selectively allow operational power to flow from a power supply to a load. The operational power is independent of auxiliary power which may be separately provided to the load. The apparatus is provided with a plurality of modules including a detection module and switch module.

The detection module determines whether an input impedance of the load is greater than a minimum impedance threshold in response to the load being connected to the power supply. The switch module causes the power bus switch to allow operational power to flow to the load in response to the detection module determining that the input impedance is greater than the minimum impedance threshold. Thus, if the load has an acceptable input impedance level, then operational power may be provided to the load without risk of failure to the power system.

The switch module, in one embodiment, is configured to cause the power bus switch to prevent operational power from flowing to the load in response to the detection module determining that the input impedance is not greater than the minimum impedance threshold. Thus, if the load has an unacceptable input impedance level, the power supply is prevented from providing operational power to the load as it is likely a failure will occur.

In one embodiment, the detection module determines whether the input impedance of the load is greater than the minimum impedance threshold by comparing a voltage across the input of the load with a predetermined reference voltage. A known current may be provided to the input of the load during detection of the voltage across the input of the load. Preferably, such a provided current is limited below a minimum current threshold to prevent failures in the power system that may be caused by an over-load condition.

In one embodiment, the power bus switch and detection module may be implemented within the power supply. In another embodiment, the detection module may be implemented within the load where the load is an electronic device. If the detection module is implemented within the load, the detection module may receive auxiliary power from the power supply in response to the load being connected to the power supply. Then, the detection module may utilize the auxiliary power to determine whether the input impedance for the load is greater than a minimum impedance threshold before operational power is provided to the load. In one embodiment, the power bus switch and detection module may both be implemented in the load.

In some embodiments of the apparatus, multiple loads, power bus switches, detection modules, and switch modules may be utilized. For example, the apparatus may include a second power bus switch that operates to selectively allow operational power to flow from the power supply to a second load. The second load may correspond to a second detection module that determines whether an input impedance of the second load is greater than a minimum impedance threshold in response to the second load being connected to the power supply. The apparatus may also include a second switch module that causes the second power bus switch to allow operational power to flow to the second load in response to the second detection module determining that the input impedance is greater than the minimum impedance threshold. In this way, multiple loads may be safely connected to the power supply.

A system of the present invention is also presented to safely connect a device to a power source. The system may substantially include the disclosed embodiments described above with respect to the apparatus. The system may include a power supply configured to provide power to a load and a power bus switch that operates to selectively allow operational power to flow from the power supply to the load. Operational power is typically independent of auxiliary power that may be provided to the load. The system may also include the detection module and switch module as described above with respect to the apparatus.

The system may further include a load, such as an electronic device configured to connect to and receive power from the power supply. In various embodiments, the load may be a blade server, peripheral component interconnect (PCI) card, personal computer, laptop, router, switch, personal digital assistant, appliance, digital media player, or other electronic device as will be recognized by one of skill in the art.

In one embodiment, the switch module causes the power bus switch to allow operational power to flow to the load in response to the electronic device being in a turned on state and the detection module determining that the input impedance is greater than the minimum impedance threshold. Thus, if the electronic device is turned on and the input impedance is acceptable, then operational power may be provided to the load.

In one embodiment of the system, the detection module may include a comparator for comparing a load input voltage to a reference voltage.

In further embodiments, the system may include one or more additional loads configured to connect to and receive power from the power supply. One or more additional power bus switches corresponding respectively to the one or more additional loads may also be included, each power bus switch operating to selectively allow operational power to flow from the power supply to the one or more corresponding additional loads in response to the respective loads having an input impedance greater than a minimum impedance threshold.

A method of the present invention is also presented for safely connecting a device to a power source. The method in the disclosed embodiments substantially includes the steps necessary to carry out the functions presented above with respect to the operation of the described apparatus and system. In one embodiment, the method includes operating a power bus switch to selectively allow operational power to flow from a power supply to a load. Typically, the operational power is independent of auxiliary power. The method also may include determining whether an input impedance of the load is greater than a minimum impedance threshold in response to the load being connected to the power supply and causing the power bus switch to allow operational power to flow to the load in response to the detection module determining that the input impedance is greater than the minimum impedance threshold.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
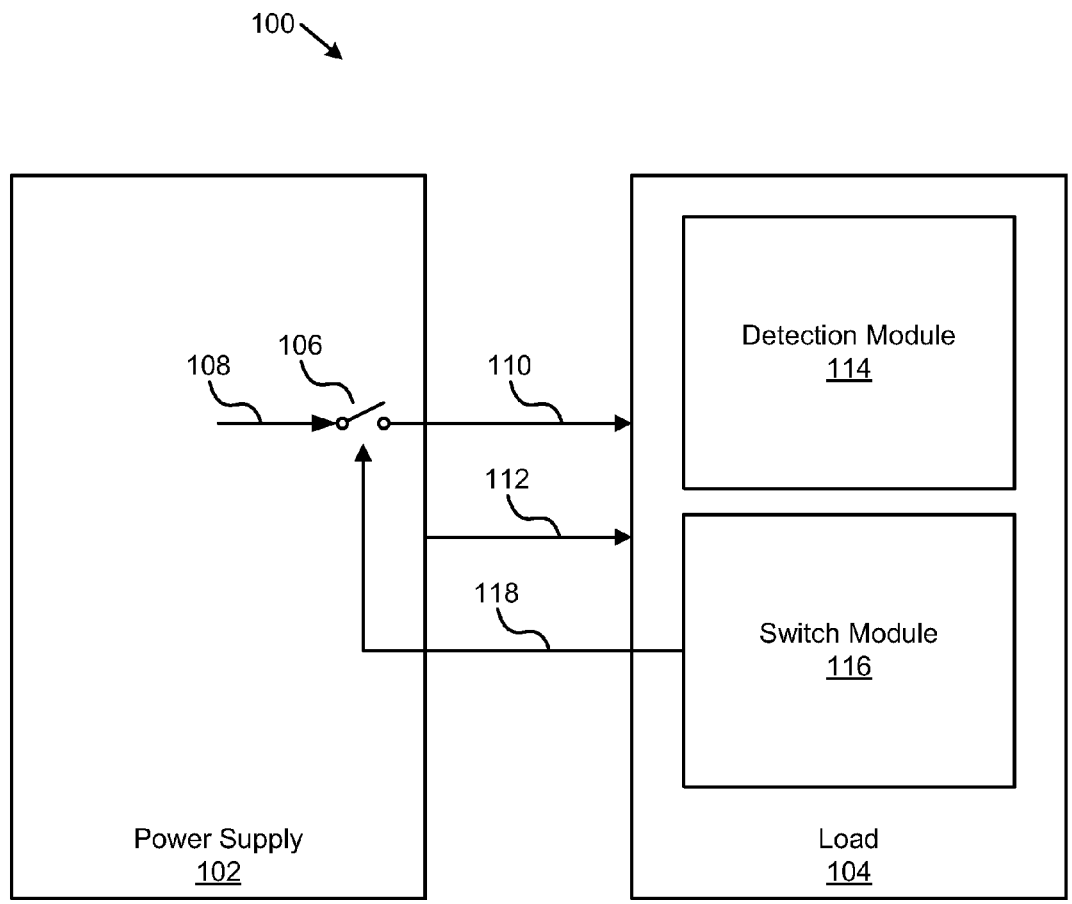
FIG. 1 is a schematic block diagram illustrating one embodiment of a system for safely connecting a device to a power supply in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and maybe embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for safely connecting a device to a power supply 102. The system 100 includes a power supply 102 and a load 104.

In one embodiment, the power supply 102 provides regulated power to the load 104 in order to power various electronic systems and subsystems within the load 104. The power supply 102 is typically connected to the load 104 by a regulated power bus 108. The power bus 108 and power supply 102 may be configured to provide one or more different voltages and currents to the load 104. For example, in a typical power supply 102, voltages of +12 v, +5 v, +3.3 v, and −12 v are commonly provided.

The power supply 102 may include different functionalities and topologies for providing regulated power to the load 104. As will be recognized by those of skill in the art, typical topologies may include rectification, boost, buck, or other topology. The switching power supply 102 may also include various stages that combine one or more of these topologies in order provide one or more desired output voltages to the load 104.

In various embodiments, the load 104 may be an electronic device 104 that receives power from the power supply 102. For example, the electronic device 104 maybe a computer system such as a desktop, laptop, or server. In one embodiment, the power supply 102 may be configured to provide power to the various components of the computer system. In other embodiments, the electronic device 104 may include devices such as blade servers, PCI cards, routers, switches, personal digital assistants ("PDAs"), displays, appliances or other electronic devices 104 as recognized by one of skill in the art. In some embodiments, the power supply 102 may be implemented within the same enclosure as the electronic device 104, such as within a computer tower case. In other embodiments, the power supply 102 may be implemented external to the electronic device 104 and may be connected to the electronic device 104 via a connection means such as a cord, cable, or bus such as in a blade center. In one embodiment, the electronic device 104 maybe configured as "hot pluggable" with the power supply 102, "hot pluggable" meaning that the device can be connected to and disconnected from the power supply 102 while the power supply 102 is running without additional manual configuration of the power supply 102. An example of a "hot pluggable" device is a blade server.

A power bus switch 106 is also provided with the system 100 that operates to selectively allow operational power 110 to flow from the power supply 102 to the load 104. The power bus switch 106 is preferably a metal-oxide-semiconductor field-effect transistor ("MOSFET") that can be switched on or off by the application of a signal to the gate of the MOSFET. In operation, the switch 106 may be closed to connect the power bus 108 to the load 104 such that operational power 110 flows from the power supply 102 to the load 104.

In accordance with this invention, operational power 110 is understood to be the main supply of power to the load 104. The operational power 110 typically powers most operations performed by the load 104. Auxiliary power 112 may also be provided to the load 104 independent of the operational power 110. The auxiliary power 112 is typically a low-voltage supply that may be used to perform background operations such as maintaining a system clock. In accordance, with the present invention, the auxiliary power 112 may also be used to provide power to the detection module 114 and switch module 116 before operational power 110 is allowed to flow to the load 104 as will be described in greater detail below.

As depicted in FIG. 1, the power bus switch 106 is provided within the power supply 102; however, those of skill in the art will recognize that other configurations are possible. For example, the power bus switch 106 may be provided on a power bus 108 external to the power supply 102 or may be provided within the load 104.

The detection module 114 and switch module 116 operate to determine, upon connection of the load 104 to the power supply 102, whether the load 104 can safely receive operational power 110 from the power supply 102. For example, if there is a short circuit condition in the load 104, it maybe unsafe to allow the load 104 to receive operational power 110 from the power supply 102. Such a condition may cause a shutdown of the power supply 102 or may cause physical damage to the power supply 102.

In some embodiments, particularly in devices where the detection module 114 and switch module 116 are provided within the load 104, the detection module 114 and switch module 116 may be powered by auxiliary power 112 prior to the load 104 receiving full operational power 110. For example, upon physical connection of a load 104 to the power supply 102, auxiliary power 112 may be immediately provided to the detection module 114 even though operational power 110 may not be immediately provided such that the detection module 114 in conjunction with the switch module 116 can determine if it is safe to provide operational power 110 to the load 104.

In one embodiment, the detection module 114 determines whether an input impedance of the load 104 is greater than a minimum impedance threshold. A low input impedance of the load 104 may be indicative of a short circuit or other unsafe condition in the load 104. Preferably, the detection module 114 determines the input impedance of the load 104 upon connection of the load 104 to the power supply 102. For example, the detection module 114 may determine the input impedance of a load 104 upon physical connection of the load 104 to the power supply 102 or upon closing a switch that connects the load 104 to the power supply 102. In some embodiments, as will be recognized by those of skill in the art, the detection module 114 may determine the impedance of the load 104 upon startup of a system or in response to turning on the load 104 or power supply 102.

One way for the detection module 114 to determine the impedance of the load 104 is to detect a voltage across the input of the load 104. A known current may be provided to the load 104 during detection of the voltage across the input of load 104 as will be recognized by those of skill in the art. Preferably, such a current is below a minimum current threshold such that even if there is a short circuit in the load 104, the short circuit will not cause significant damage to the power supply 102.

Once a voltage across the input of the load 104 is determined, it may be compared to a reference voltage to determine whether it is safe to provide operational power 110 to the load 104 from the power supply 102. For example, a load input voltage greater than a predetermined reference voltage is indicative that the input impedance of the load 104 is greater than a minimum impedance threshold, and therefore, the load 104 is unlikely to cause a failure due to low impedance. Conversely, if the load input voltage is lower than the reference voltage, then a short circuit is likely, and it may be unsafe to operatively connect the load 104 to the power supply 102.

The switch module 116 controls the power bus switch 106 to selectively allow operational power 110 to flow to the load 104 if the detection module 114 determines it is safe to do so. For example, the switch module 116 may cause the power bus switch 106 to close to allow operational power 110 to flow to the load 104 in response to the detection module 114 determining that the input impedance of the load 104 is greater than a minimum impedance threshold. In one embodiment, the switch module 116 sends a control signal 118 to the power bus switch 106 to cause the switch 106 to close, thereby allowing the operational power 110 to flow to the load 104. Conversely, if the detection module 114 determines it is unsafe to connect the load 104 to the power supply 102, the switch module 116 may send a signal 118 to maintain the power bus switch 106 in an open position, thereby preventing operational power 110 from flowing to the load 104. Upon connection of the operational power 110 to the load 104, the system 100 may then continue to operate normally without risk of catastrophic failure caused by low impedance conditions in the load 104.

Figure 2:
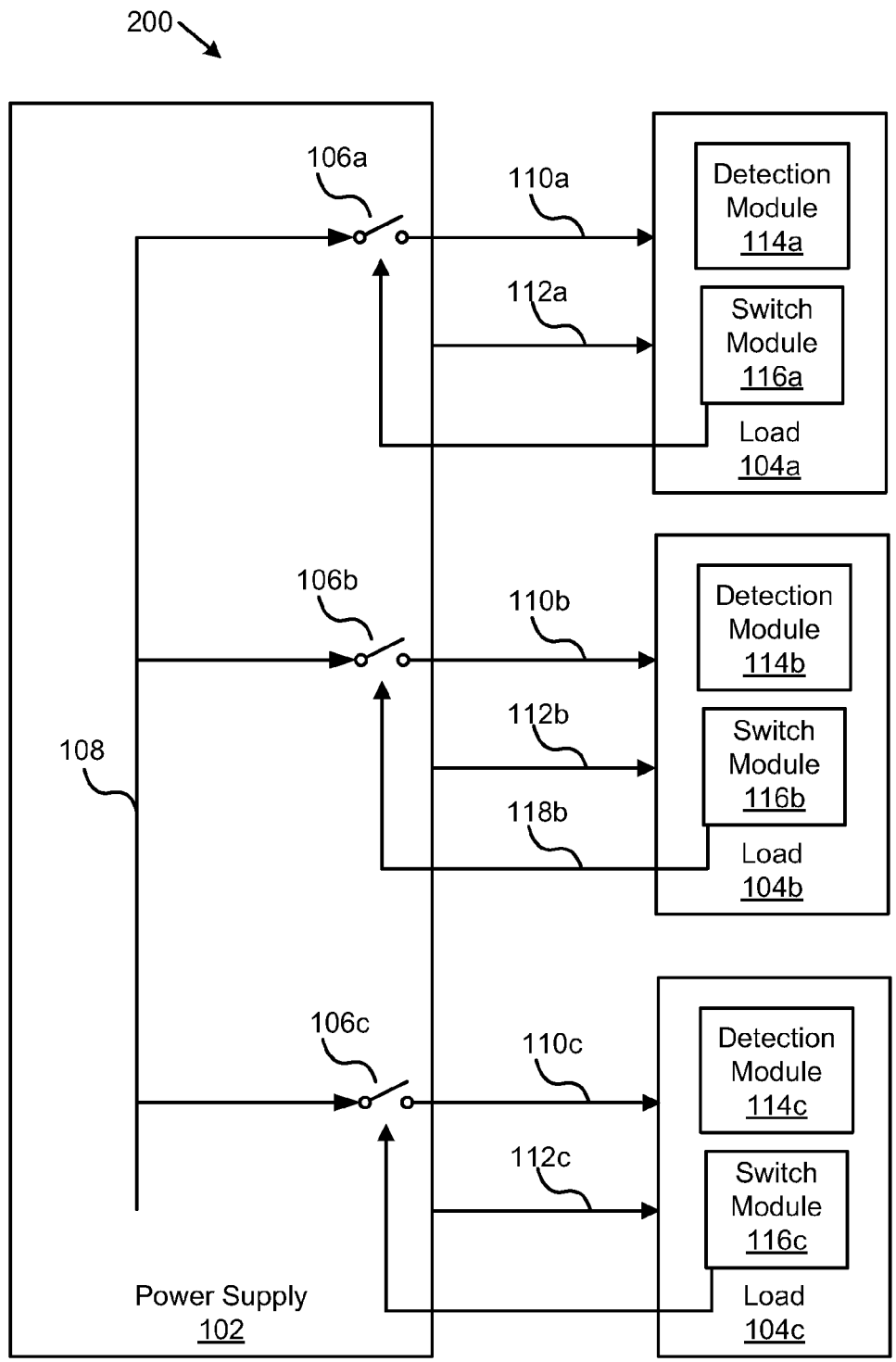
FIG. 2 is a schematic block diagram illustrating one embodiment of a system for safely connecting a plurality of devices to a power supply in accordance with the present invention.

FIG. 2 is a schematic block diagram illustrating one embodiment of a system 200 for safely connecting a plurality of loads 104a-c to a power supply 102 in accordance with the present invention. The power supply 102 is configured to provide power to a power bus 108 that includes multiple power bus switches 106a-c for connecting multiple loads 104a-c to the power supply 102. In the system 200, the switches 106a-c, detection modules 114a-c, and switch modules 116a-c operate in substantially the same manner as is described above with regard to FIG. 1 to selectively provide operational power 110a-c to the loads 104a-c. Auxiliary power 112a-c may be independently provided to each of the loads 104a-c. Preferably, each power bus switch 106a-c operates independently of each of the other power bus switches 106a-c such that the power supply 102 is protected from connection to any single load 104a-c that may cause a failure in the power supply 102.

For example, each time an additional load 104b is connected to the power supply 102, the detection module 114b determines if the load 104b can be safely connected to the power supply 102. Preferably, this is accomplished by determining if the input impedance of the load 104b is greater than a minimum impedance threshold. If the detection module 114b determines that it is safe to provide operational power 110 to the load 104b, then the switch module 116b sends a signal 118b to the corresponding power bus switch 106b to cause operational power 110b to flow to the additional load 104b.

By utilizing independent switches 106a-c for each of the loads 104a-c, previously connected loads 104a are protected from a failure of the power supply 102 caused by a subsequently connected load 104b. For example, if a single load 104a-c with unacceptably low impedance is connected to the power supply 102, a fuse or other protection device in the power supply 102 may cause a shutdown of the entire system 200 thereby causing all of the loads 104a-c to lose power. Additionally, significant physical damage may result before a shutdown can occur which may result in destruction of the power supply 102.

In other embodiments, it is also contemplated that multiple loads 104a-c may be configured to operate in conjunction with a single power bus switch 106a such that a plurality of loads 104a-c selectively receive operational power 110a-c via the single power bus switch 106a. In such an embodiment, the loads 104a-c may each be configured with a detection module 114a-c and switch module 116a-c such that the power bus switch 106a only provides power to the plurality of loads 104a-c if each detection module 114a-c corresponding to each load 104a-c determines that it is safe to do so.

In various additional embodiments, the detection modules 114a-c and the switch modules 116a-c may be provided within the power supply 102 or external to both the power supply 102 and the loads 104a-c.

Figure 3:
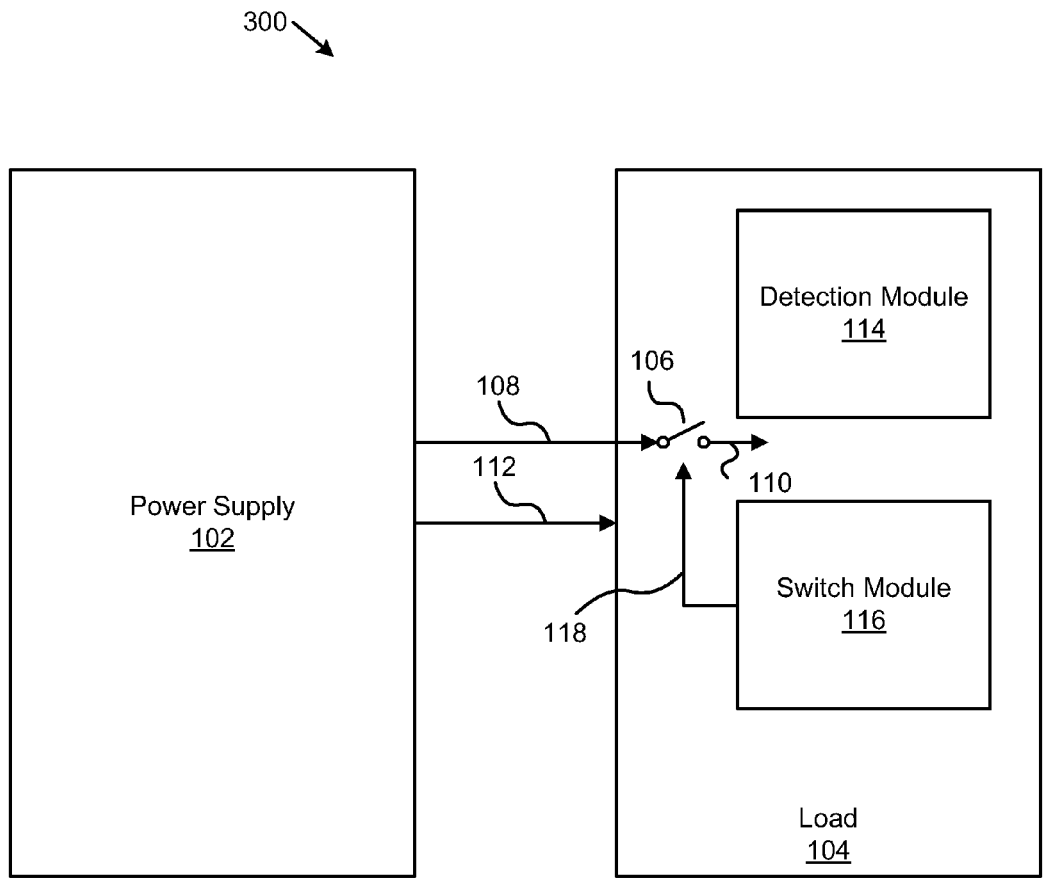
FIG. 3 is a schematic block diagram illustrating another embodiment of a system for safely connecting a device to a power supply in accordance with the present invention.
Figure 4:
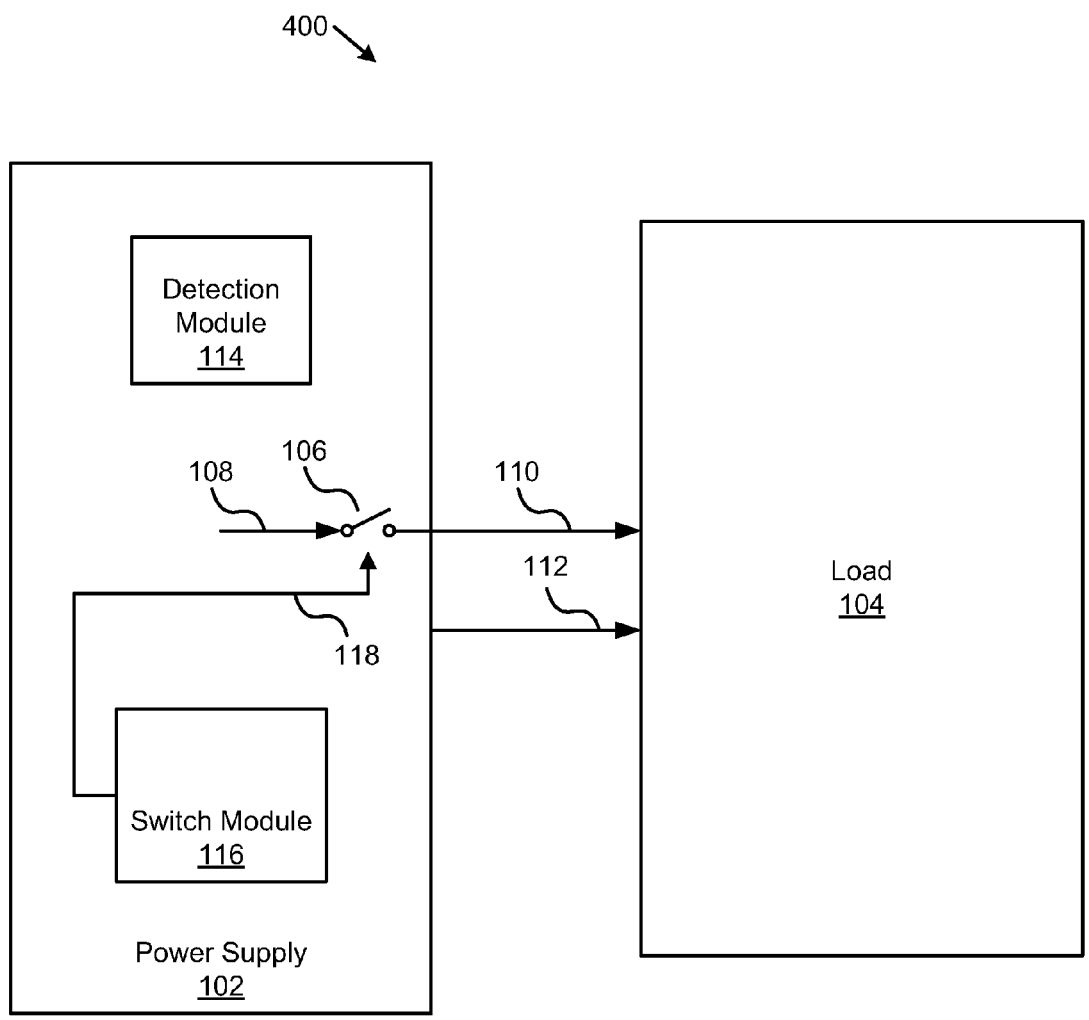
FIG. 4 is a schematic block diagram illustrating another embodiment of a system for safely connecting a device to a power supply in accordance with the present invention.

FIGS. 3 and 4 are schematic block diagrams illustrating additional embodiments for safely connecting a load 104 to a power supply 102 in accordance with the present invention. In the various embodiments depicted in FIGS. 3 and 4, the circuitry and logic for safely connecting a load 104 to a power supply 102 may be provided in different configurations and locations.

FIG. 3 depicts an embodiment of a system 300 in which the power bus switch 106, detection module 114, and switch module 116 are each provided within the load 104. Such a configuration may be desirable in situations where a power bus switch 106 is not provided within the power supply 102 or on a power bus 108 attached to the power supply 102. Such a configuration allows for a load 104 that includes a power bus switch 106, detection module 114, and switch module 116 to be safely connected to a conventional power supply 102 without further configuration of the power supply 102.

FIG. 4 depicts a contemplated embodiment of a system 400 in which the power bus switch 106, detection module 114, and switch module 116 are each provided within the power supply 102. Such an embodiment would allow a conventional load to be safely connected to the power supply 102 in accordance with the present invention without further configuration of the load 104.

Other embodiments are also contemplated which are not described herein, including for example, wherein the power bus switch 106, detection module 114, and switch module, or combinations of these components are provided externally to both the power supply 102 and load 104.

Figure 5:
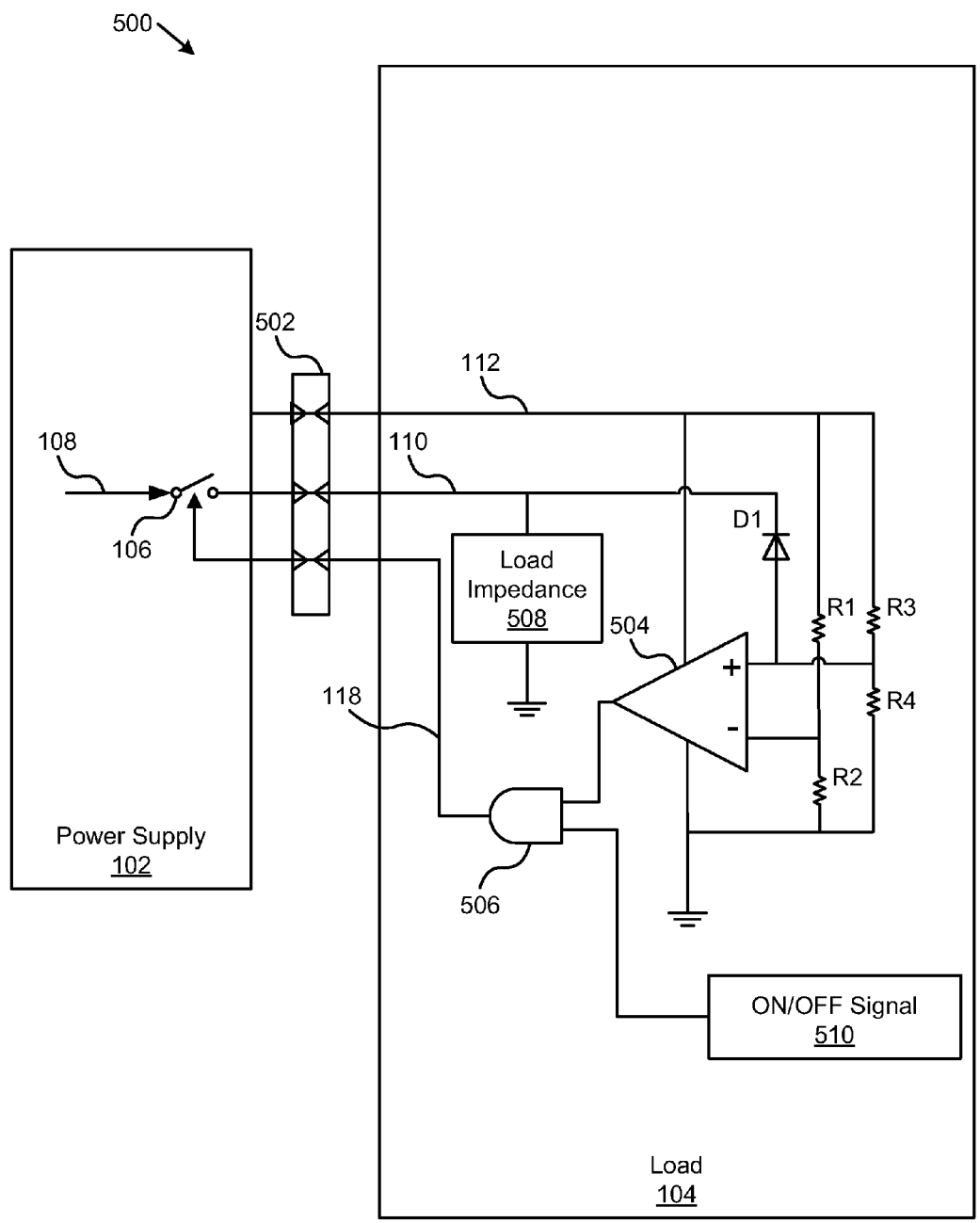
FIG. 5 is a schematic block diagram illustrating one detailed embodiment of a system for safely connecting a device to a power supply in accordance with the present invention.

FIG. 5 is a schematic block diagram illustrating one detailed embodiment of a system 500 for safely connecting a device to a power supply 102 in accordance with the present invention. Although FIG. 5 depicts a particular configuration of circuitry and logic, those of skill in the art will recognize that numerous other configurations and embodiments may be used in accordance with the present invention to perform the recited logic.

As depicted, a power supply 102 is connected to a load 104 via a bus connector 502. The power supply 102 includes a power bus switch 106 for selectively providing operational power 110 from the power bus 108 to the load 104. Auxiliary power 112 is also independently provided to the load 104. The load 104 includes a detection module 114 and switch module 116 embodied as logic circuitry in the form of a comparator circuit 504 including additional components such as a diode D1 and resistors R1, R2, R3, and R4.

The auxiliary power 112 is utilized by the comparator circuit 504 to determine if the load impedance 508 is greater than a minimum impedance threshold. The minimum impedance threshold is provided to the comparator circuit 504 as a reference voltage defined by the voltage of auxiliary power 112 divided between two resistors R1, R2. The load impedance 508 is in parallel with a resistor R4 and is provided as a representative voltage input to the comparator circuit 504 through a diode D1.

The representative input voltage of the load impedance 508 is compared with the minimum impedance threshold (reference voltage) by the comparator circuit 504 to determine if the load impedance 508 is above the minimum impedance threshold. If the load impedance 508 is above the minimum impedance threshold, then the comparator circuit 504 provides a 'high' output signal to the input of the AND gate 506. Conversely, if the load impedance 508 is below the minimum impedance threshold, then the comparator circuit 504 provides a 'low' output signal to the AND gate, thereby causing a 'low' output signal 118 from the AND gate 506 to be provided to the power bus switch 106. A 'low' output signal 118 causes the power bus switch 106 to remain open, thereby preventing operational power 110 from flowing to the low impedance load 104.

In one embodiment, the AND gate 506 also receives an ON/OFF signal 510 that indicates whether the load 104 is currently turned on or turned off. If the load 104 is turned on, then a 'high' signal is provided to an input of the AND gate 506. If the load 104 is turned off, then a 'low' signal is provided to an input of the AND gate 506. Thus, the AND gate 506 receives one input from the comparator circuit 504 and one input from the ON/OFF signal 510, and operates to provide a 'high' signal 118 to the power bus switch 106 only if the load 104 is both turned on and the load impedance 508 is at an acceptable level (above the minimum power threshold). If a 'high' signal 118 is provided to the power bus switch 106, then the switch 106 closes and operational power 110 is allowed to flow to the load 104.

In this manner, the system 500 is able to safely connect the load 104 to the power supply 102 without risk failures caused by low load impedance.

Figure 6:
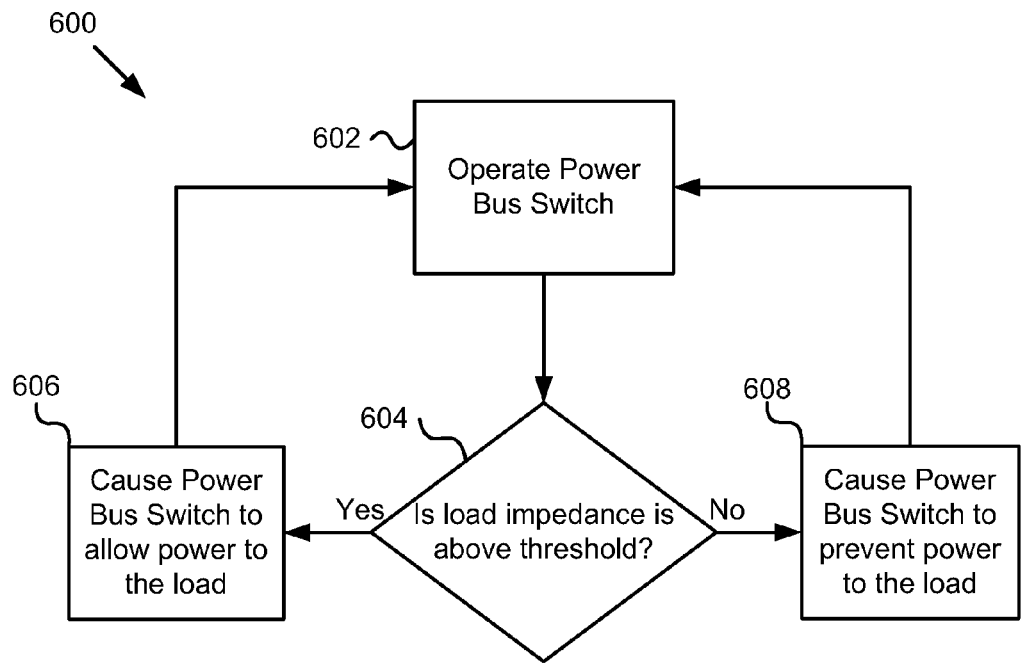
FIG. 6 is a schematic flow chart illustrating one embodiment of a method for safely connecting a device to a power supply in accordance with the present invention.

FIG. 6 is a schematic flow chart illustrating one embodiment of a method 600 for safely connecting a load 104 to a power supply 102 in accordance with the present invention. The method 600 substantially includes the embodiments described above with regard to FIGS. 1-5.

The method 600 begins by operating 602 a power bus switch 106 to selectively allow operational power 110 to flow from a power supply 102 to a load 104. The power bus switch 106 is typically operable to allow operational power 110 to flow to the load 104 when in a closed state, and to prevent operational power 110 to flow to the load 104 when in an open state. Preferably, auxiliary power 112 is provided to the load 104 independently of the operational power 110.

A detection module 114 determines 604 whether an input impedance 508 of the load 104 is greater than a minimum input impedance threshold. This is preferably done in response to the load 104 being connected to the power supply 102 and prior to the load 104 receiving any operational power 110 from the power supply 102.

If the load impedance 508 is greater than the minimum impedance threshold, then a switch module 116 causes 606 the power bus switch 106 to allow operational power 110 to flow to the load 104. This is preferably accomplished by sending a signal 118 from the switch module 116 to the power bus switch 106.

If the load impedance 508 is not greater than the minimum impedance threshold, then the switch module 116 causes 608 the power bus switch 106 to open to prevent operational power 110 from flowing to the load 104. The method 600 allows for the load 104 to be connected to the power supply 102 only if it is safe to do so.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for safely connecting a device to a power source, the apparatus comprising:
    a power bus switch that operates to selectively allow operational power to flow from a power supply to a load, wherein operational power is independent of auxiliary power;
    a detection module that determines whether an input impedance of the load is greater than a minimum impedance threshold in response to the load being connected to the power supply; and
    a switch module that causes the power bus switch to allow operational power to flow to the load in response to the detection module determining that the input impedance is greater than the minimum impedance threshold.

2. The apparatus of claim 1, wherein the switch module causes the power bus switch to prevent operational power from flowing to the load in response to the detection module determining that the input impedance is not greater than the minimum impedance threshold.

3. The apparatus of claim 1, wherein the detection module determines whether the input impedance of the load is greater than the minimum impedance threshold by comparing a voltage across an input of the load with a predetermined reference voltage.

4. The apparatus of claim 3, wherein a known current is provided to the input of the load during detection of the voltage across the input of the load.

5. The apparatus of claim 4, wherein the provided current is limited below a minimum current threshold.

6. The apparatus of claim 1, wherein the power bus switch is implemented within the power supply.

7. The apparatus of claim 6, wherein the detection module is implemented within the power supply.

8. The apparatus of claim 6, wherein the detection module is implemented within the load, the load comprising an electronic device.

9. The apparatus of claim 8, wherein the detection module receives auxiliary power from the power supply in response to the load being connected to the power supply, the detection module utilizing the auxiliary power to determine whether an input impedance of the load is greater than a minimum impedance threshold.

10. The apparatus of claim 1, wherein the power bus switch is implemented within the load.

11. The apparatus of claim 1, further comprising a second power bus switch that operates to selectively allow operational power to flow from a power supply to a second load, the second load corresponding to a second detection module that determines whether an input impedance of the second load is greater than a minimum impedance threshold in response to the second load being connected to the power supply, and further comprising a second switch module that causes the second power bus switch to allow operational power to flow to the second load in response to the second detection module determining that the input impedance is greater than the minimum impedance threshold.

12. A system for safely connecting a device to a power source, the system comprising:
a power supply configured to provide power to a load;
a power bus switch that operates to selectively allow operational power to flow from the power supply to the load, wherein operational power is independent of auxiliary power;
a detection module that determines whether an input impedance of the load is greater than a minimum impedance threshold in response to the load being connected to the power supply; and
a switch module that causes the power bus switch to allow operational power to flow to the load in response to the detection module determining that the input impedance is greater than the minimum impedance threshold.

13. The system of claim 12, further comprising a load, the load comprising an electronic device configured to connect to and receive power from the power supply.

14. The system of claim 13, wherein the electronic device is one of a blade server, peripheral component interconnect (PCI) card, personal computer, laptop, router, switch, personal digital assistant, appliance, and digital media player.

15. The system of claim 13, wherein the switch module causes the power bus switch to allow operational power to flow to the load in response to the electronic device being in a turned on state and the detection module determining that the input impedance is greater than the minimum impedance threshold.

16. The system of claim 12, wherein the detection module comprises a comparator for comparing a load input voltage to a reference voltage.

17. The system of claim 12, further comprising one or more additional loads configured to connect to and receive power from the power supply.

18. The system of claim 17, further comprising one or more additional power bus switches corresponding respectively to the one or more additional loads, each power bus switch operating to selectively allow operational power to flow from the power supply to the one or more corresponding additional loads in response to the respective loads having an input impedance greater than a minimum impedance threshold.

19. A computer program product comprising a computer readable medium having computer usable program code executable to perform operations for safely connecting a device to a power source, the operations of the computer program product comprising:
operating a power bus switch to selectively allow operational power to flow from a power supply to a load, wherein operational power is independent of auxiliary power;
determining whether an input impedance of the load is greater than a minimum impedance threshold in response to the load being connected to the power supply; and
causing the power bus switch to allow operational power to flow to the load in response to the detection module determining that the input impedance is greater than the minimum impedance threshold.

20. A method for safely connecting a device to a power source, the method comprising:
operating a power bus switch to selectively allow operational power to flow from a power supply to a load, wherein operational power is independent of auxiliary power;
determining whether an input impedance of the load is greater than a minimum impedance threshold in response to the load being connected to the power supply; and
causing the power bus switch to allow operational power to flow to the load in response to the detection module determining that the input impedance is greater than the minimum impedance threshold.

* * * * *